US012244600B2

(12) United States Patent
Corrigan

(10) Patent No.: US 12,244,600 B2
(45) Date of Patent: Mar. 4, 2025

(54) MANAGING SOFTWARE APPLICATION ACCESS BASED ON APPLICATION GROUPINGS

(71) Applicant: Diana Corrigan, Lincroft, NJ (US)

(72) Inventor: Diana Corrigan, Lincroft, NJ (US)

(*) Notice: Subject to any disclaimer, the term of this patent is extended or adjusted under 35 U.S.C. 154(b) by 826 days.

(21) Appl. No.: 17/373,754

(22) Filed: Jul. 12, 2021

(65) Prior Publication Data

US 2022/0038464 A1 Feb. 3, 2022

Related U.S. Application Data

(60) Provisional application No. 63/060,044, filed on Aug. 1, 2020.

(51) Int. Cl.
*H04L 9/40* (2022.01)
*H04L 67/50* (2022.01)

(52) U.S. Cl.
CPC .......... *H04L 63/104* (2013.01); *H04L 63/102* (2013.01); *H04L 63/20* (2013.01); *H04L 67/535* (2022.05)

(58) Field of Classification Search
CPC ..... H04L 63/104; H04L 63/102; H04L 63/20; H04L 67/535; G06F 11/3438; G06F 2201/81; G06F 2201/88; G06F 11/302; G06F 2201/865
See application file for complete search history.

(56) References Cited

U.S. PATENT DOCUMENTS

| 10,277,948 | B2* | 4/2019 | Meijer | H04N 21/4532 |
| 10,373,411 | B2 | 8/2019 | Smith et al. | |
| 11,159,632 | B2* | 10/2021 | Umeya | G06F 21/121 |
| 2004/0003071 | A1* | 1/2004 | Mathew | H04L 63/0227 |
| | | | | 707/E17.109 |
| 2004/0034799 | A1* | 2/2004 | Mikami | G06F 16/954 |
| | | | | 726/28 |
| 2005/0143175 | A1* | 6/2005 | Ahlquist | A63F 13/79 |
| | | | | 463/42 |
| 2009/0165033 | A1* | 6/2009 | Clancy | H04N 7/17318 |
| | | | | 725/25 |
| 2012/0215328 | A1* | 8/2012 | Schmelzer | G16H 20/30 |
| | | | | 700/91 |
| 2013/0047229 | A1* | 2/2013 | Hoefel | G06F 21/121 |
| | | | | 726/3 |

(Continued)

OTHER PUBLICATIONS

Van Bruggen, Dirk, et al. "Modifying smartphone user locking behavior." Proceedings of the Ninth Symposium on Usable Privacy and Security. 2013. (Year: 2013).*

*Primary Examiner* — Jung W Kim
*Assistant Examiner* — Sameera Wickramasuriya

(57) ABSTRACT

In one example, the present disclosure describes a device, computer-readable medium, and method for managing software application access based on application groupings. For instance, in one example, a method performed by a processing system of a user device may include receiving a request from a user of the user device to unlock access to a first grouping of software applications accessible to the user via the user device and responding to the request based on usage by the user of software applications in a second grouping of software applications accessible to the user via the user device, wherein the second grouping is distinct from the first grouping.

20 Claims, 8 Drawing Sheets

(56) References Cited

U.S. PATENT DOCUMENTS

| | | | |
|---|---|---|---|
| 2014/0280944 A1* | 9/2014 | Montgomery | H04L 67/52 |
| | | | 709/225 |
| 2015/0032887 A1* | 1/2015 | Pesek | H04W 12/08 |
| | | | 709/224 |
| 2016/0112763 A1* | 4/2016 | Meijer | H04N 21/6547 |
| | | | 725/30 |
| 2017/0195404 A1* | 7/2017 | Montgomery | H04L 67/125 |
| 2018/0350173 A1* | 12/2018 | Smith | G07C 9/30 |
| 2019/0355192 A1* | 11/2019 | Smith | G07C 9/30 |

\* cited by examiner

US 12,244,600 B2

MANAGING SOFTWARE APPLICATION ACCESS BASED ON APPLICATION GROUPINGS

CROSS REFERENCE TO RELATED APPLICATIONS

This application claims the benefit of U.S. Provisional Patent Application Ser. No. 63/060,044, filed Aug. 1, 2020, which is herein incorporated by reference in its entirety.

FIELD OF THE INVENTION

The present disclosure relates generally to electronic entertainment, and relates more particularly to devices, non-transitory computer-readable media, and methods for managing access to electronic entertainment, such as software applications, based on groupings of applications.

BACKGROUND

Various parenting and children's health organizations, including the American Academy of Pediatrics, have long advised that parents should limit their children's screen time. Screen time is generally understood to include any access to devices with screens, including smart phones, computers, tablet computers, televisions, and video game systems.

SUMMARY

In one example, the present disclosure describes a device, computer-readable medium, and method for managing software application access based on application groupings. For instance, in one example, a method performed by a processing system of a user device may include receiving a request from a user of the user device to unlock access to a first grouping of software applications accessible to the user via the user device and responding to the request based on usage by the user of software applications in a second grouping of software applications accessible to the user via the user device, wherein the second grouping is distinct from the first grouping.

In another example, a non-transitory computer-readable storage medium stores instructions which, when executed by a processor of a user device, cause the processor to perform operations. The operations include receiving a request from a user of the user device to unlock access to a first grouping of software applications accessible to the user via the user device and responding to the request based on usage by the user of software applications in a second grouping of software applications accessible to the user via the user device, wherein the second grouping is distinct from the first grouping.

In another example, a method performed by a processing system including at least one processor includes receiving a request from a user of a remote user device to unlock access to a first grouping of software applications accessible to the user via a set of user devices including the remote user device and responding, by the processing system, to the request based on usage by the user of software applications in a second grouping of software applications accessible to the user via the set of user devices, wherein the second grouping is distinct from the first grouping.

In another example, a non-transitory computer-readable storage medium stores instructions which, when executed by a processor of a user device, cause the processor to perform operations. The operations include receiving a request from a user of a remote user device to unlock access to a first grouping of software applications accessible to the user via a set of user devices including the remote user device and responding to the request based on usage by the user of software applications in a second grouping of software applications accessible to the user via the set of user devices, wherein the second grouping is distinct from the first grouping.

In another example, a method performed by a processor of a user device includes sending, to a remote server, a request to unlock access to a first grouping of software applications accessible to a user via a plurality of user devices including the user device, receiving an instruction from the remote server, the instruction instructing the user device to continue locking the access to the first grouping of software applications based on a usage goal for a second grouping of software applications accessible to the user via the plurality of user devices not being met, and presenting, to the user, a message indicating an amount of time that the user must spend using the second grouping of software applications in order to unlock the access to the first grouping of software applications.

In another example, a non-transitory computer-readable storage medium stores instructions which, when executed by a processor of a user device, cause the processor to perform operations. The operations include sending, to a remote server, a request to unlock access to a first grouping of software applications accessible to a user via a plurality of user devices including the user device, receiving an instruction from the remote server, the instruction instructing the user device to continue locking the access to the first grouping of software applications based on a usage goal for a second grouping of software applications accessible to the user via the plurality of user devices not being met, and presenting a message indicating an amount of time that the user must spend using the second grouping of software applications in order to unlock the access to the first grouping of software applications.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
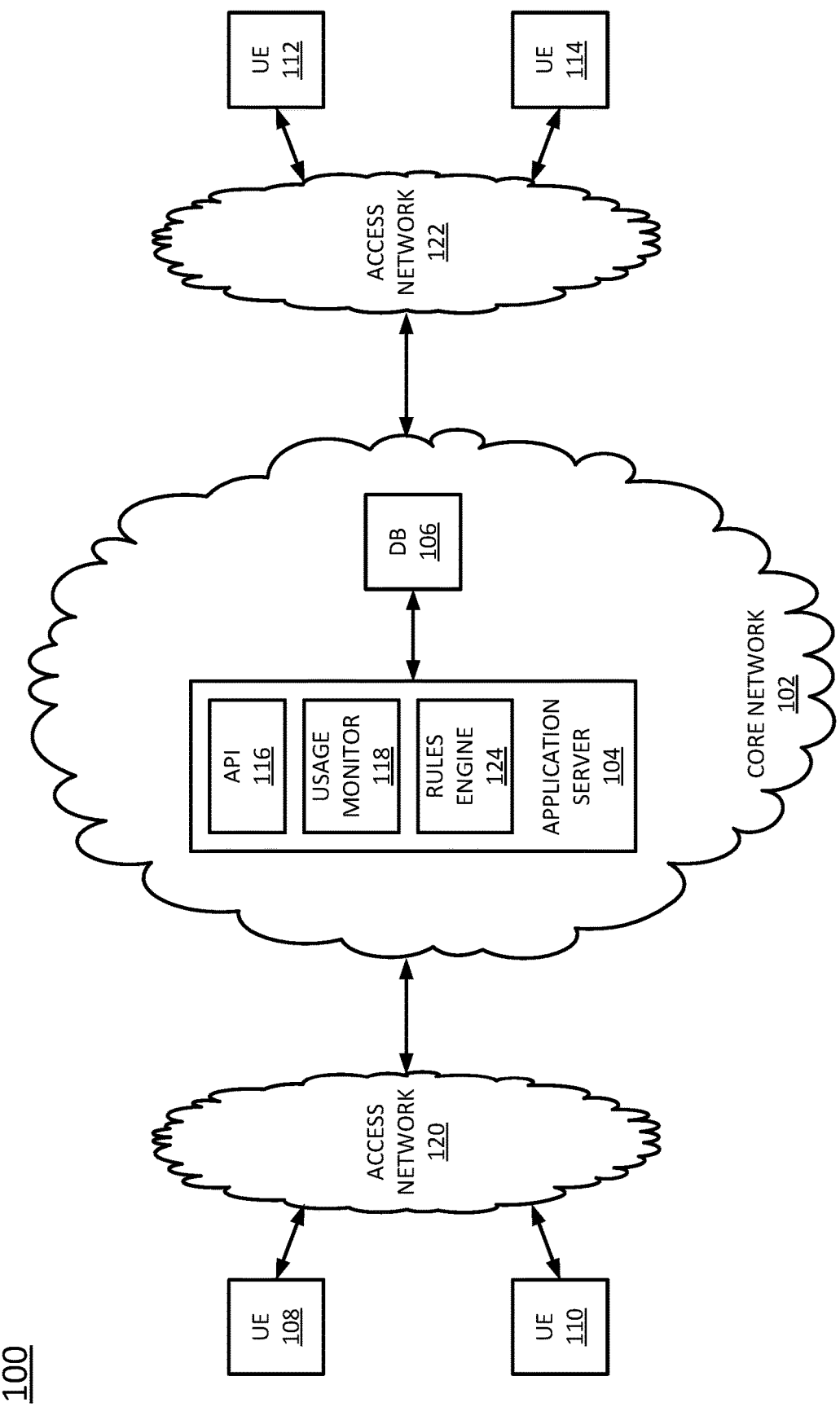
FIG. 1 illustrates an example network related to the present disclosure.

In one example, the present disclosure manages software application access based on application groupings. As discussed above, various parenting and children's health organizations, including the American Academy of Pediatrics, have long advised that parents should limit their children's screen time. For instance, too much screen time is believed to impair brain development and function, to promote poor health by discouraging physical activity, and to contribute to mood swings and insomnia, among other negative side effects.

Tools and applications have been developed to help parents manage their children's screen time. For instance, some devices and applications include features that allow parents to set limits that automatically control the amount of time that their children may spend using them. As an example, a parent may configure a limit on their child's tablet computer to ensure that their child cannot spend more than one hour each day using a video streaming application on the tablet computer. When the limit is reached, the tablet computer may "lock" (or prevent further usage of) the video streaming application. In some cases, the limit may be overridden by entering a code or causing a request to be sent to the parent's device. For instance, the parent may receive a message on his or her smart phone indicating that the child is requesting additional access to the video streaming application and giving the parent various response options, such as an option to deny the request, an option to unlock fifteen additional minutes of the video streaming application, an option to unlock an additional hour of the video streaming application, an option to unlock the video streaming application for the rest of the day, and the like. The response option chosen by the parent may be transmitted back to the child's tablet computer as an instruction for the child's tablet computer (where the instruction may instruct the child's tablet computer to unlock a specified amount of additional time).

In recent years, attitudes toward screen time have evolved. In particular, more recent advice acknowledges that some screen time can be beneficial for children. For instance, there are many software applications designed for children that promote social interaction and learning, including applications that teach math, literacy, languages, computer programming/coding, and other skills. Although many experts still recommend that screen time be limited, there is a growing recognition that some types of screen time may be more beneficial, or at least less potentially harmful, than other types of screen time. For instance, with many schools closing and/or implementing "virtual" instruction in order to facilitate social distancing during the COVID-19 pandemic, some parents may actually encourage their children to spend more time on devices that can support educational applications.

Examples of the present disclosure manage access to software applications (e.g., services or other applications that are accessible using electronic devices) based on application groupings. In one example, the software applications and services that are accessible (or installed) on a computing device may be grouped into at least two distinct groupings. The application groupings may be user-defined or customized. Access to the software applications and services belonging to a first grouping may then be managed based on usage of software applications and services belonging to a second grouping.

Thus, for instance, a parent may define a first grouping on a child's tablet computer that includes entertainment-related software applications and services (such as video streaming applications, web browsing, social media applications, video games, and the like). The parent may also define a second grouping on the child's tablet computer that includes educational software applications (such as instructional math applications, literacy applications, language learning applications, applications that teach computer programming/coding, electronic book applications, and the like). The parent may further set respective limits on the amount of time that the child is allowed to spend, per day, on applications belonging to each grouping, where the limits may be collective, i.e., applied across an entire grouping. Thus, the parent may limit the child to one hour per day using any combination of applications belonging to the first grouping, but may allow the child to spend three hours per day using any combination of applications belonging to the second grouping.

Moreover, the parent may define a rule that allows additional time to be unlocked for software applications and services belonging to the first grouping when a threshold (e.g., goal or target) amount of time is spent using software applications and services belonging to the second grouping. For instance, the child may use all of his or her allotted time for the first grouping. However, the child may be able to unlock an additional hour of time to use the software applications and services belonging to the first grouping if he or she uses the software applications or services belonging to the second grouping for at least one hour. Thus, the ability to unlock additional time for entertainment-related applications may incentivize the child to spend more time using the educational applications.

In one example, the computing device on which the limits and rules are defined (e.g., the child's tablet computer in the above example) may automatically monitor the amount of time spent using software applications and services belonging to the various groupings. The computing device may automatically unlock additional time for particular groupings in response to determining that the usage thresholds for other groupings are met. In this case, instructions for managing access to the software applications may be implemented as a standalone software application that executes on (and can be selectively downloaded onto) the computing device. Alternatively the instructions may be implemented as part of a feature of the computing device's settings (e.g., where the settings may include the ability to control screen time).

In other examples, a centralized server may monitor various devices belonging to a user, including tablet computers, personal computers, smart phones, smart televisions, video game systems, and other devices, in order to determine whether additional screen time may be unlocked for particular groupings of software applications and services. The centralized server may also control and monitor the access to the software applications and services. This may prevent a user from circumventing a limit on usage of a grouping of software applications and services by simply switching to a different device.

Thus, usage of less beneficial software applications and services may be automatically limited, usage of more beneficial software applications and services may be encouraged, and additional screen time can be automatically unlocked according to configurable rules without having to contact the person who defined the rules for permission each time the additional screen time is requested.

In further examples, the groupings, limits, and rules may be defined by someone other than a parent of a user. For instance, educators may use the same approach to reward students for spending a certain amount of time using educational software applications on classroom computers. Thus, examples of the present disclosure may also prove useful in educational settings where technology is regularly used to enhance or reinforce classroom instruction.

Although examples of the disclosure are discussed within the context of incentivizing the usage of educational software applications and limiting usage of entertainment-related applications, the same concepts may be applied to incentivize and/or limit usage of any other type of software application whose usage can be monitored. For instance, usage of physical fitness-related applications, mental health-related applications, meditation applications, and the like may also unlock additional screen time for entertainment-related applications.

In one example, management of a user's access to software applications and services in a particular grouping does not restrict access to emergency services. For instance, a grouping for which usage time is limited may include voice calling, video calling, email, and text messaging services. However, even if the usage limit for the grouping is reached, the user may still be able to place calls or send messages to phone numbers that are designated as "emergency" numbers or similar (e.g., parent phone numbers, 911, roadside assistance, etc.).

To better understand the present disclosure, FIG. 1 illustrates an example network 100, related to the present disclosure. The network 100 may be any type of communications network, such as, for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114.

In one example, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, at least some of the UEs 108, 110, 112, and 114 have installed thereon the same software applications and services. For instance, the same video streaming application may be installed on a user's smart phone, smart television, and tablet computer.

Figure 8:
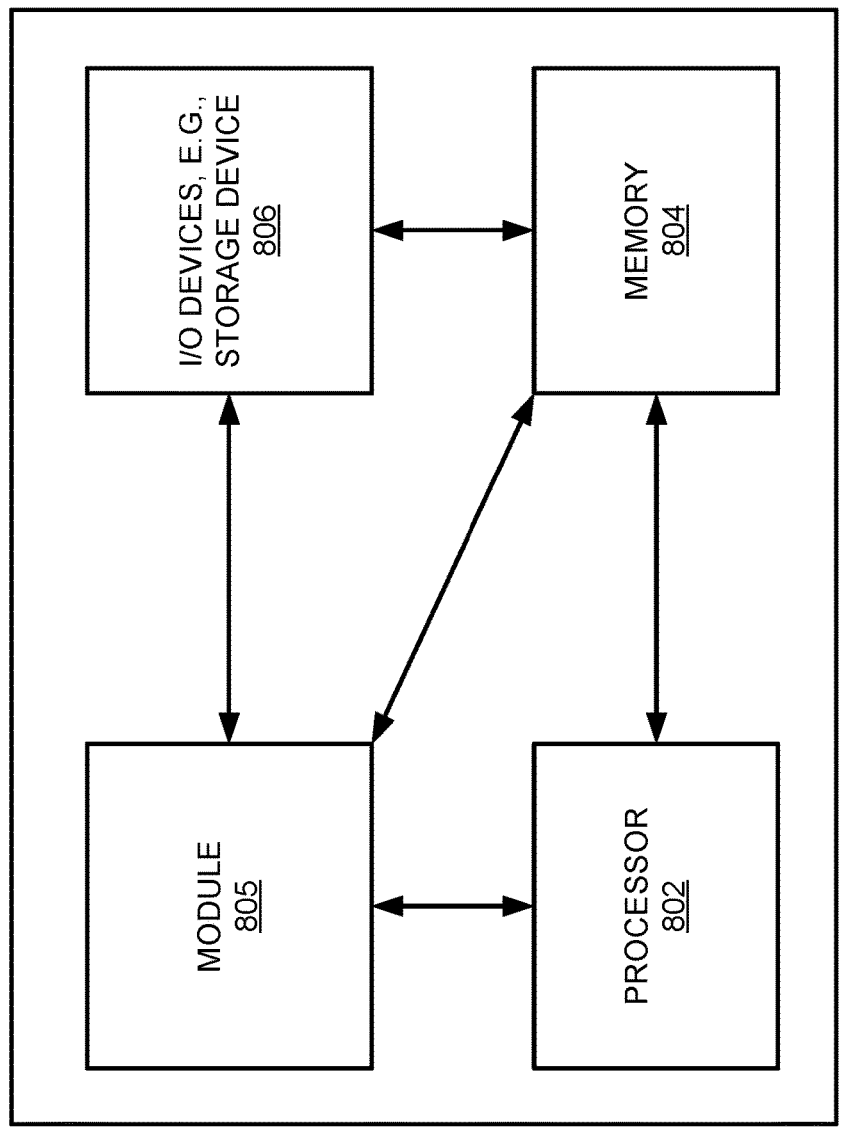
FIG. 8 depicts a high-level block diagram of a computing device specifically programmed to perform the functions described herein.

In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed. Any of the UEs 108, 110, 112, or 114 may comprise a general purpose computer that is configured to operate as a special purpose computer, as illustrated in FIG. 8 and discussed below. In one example, any of the UEs 108, 110, 112, or 114 may perform the methods discussed below related to managing software application access based on application groupings.

In one example, the AS 104 may also or alternatively perform the methods discussed below related to managing software application access based on application groupings. For instance, in one example, the AS 104 hosts an application that communicates with one or more of the UEs 108, 110, 112, and 114. As an example, the application may be a tracking application that monitors a user's usage of various groupings of software applications and services across a plurality of the UEs 108, 110, 112, and 114 (based on data captured by the UEs 108, 110, 112, and 114) and unlocks access to certain groupings of software applications and services when the usage of other groupings of software applications or services across the plurality of the UEs 108, 110, 112, and 114 meets or exceeds a predefined threshold.

The AS 104 may comprise a general purpose computer as illustrated in FIG. 8 and discussed below. In one example, the AS 104 generally comprises an application programming interface (API) 116, a usage monitor 118, and a rules engine 124. The API 116 may normalize (i.e., match to a common nomenclature) data collected from various sources in the network, including UEs 108, 110, 112, and 114. For instance, various sources may provide similar types of data, but may refer to the data using different nomenclature. Thus, normalization of the data allows the AS 104 to aggregate the data from different sources in order to better track a user's usage of software applications and services (and unlocking of additional usage) across a plurality of devices. For instance, as discussed above, a user may use the same video streaming application on his or her smart phone, tablet computer, laptop computer, and/or smart television. The smart phone, tablet computer, laptop computer, and/or smart television may utilize different operating systems, format data in different ways, and/or process data in different ways for transmission over the network 100.

The usage monitor 118 may monitor the usage of software applications and services across one or more UEs (e.g., UEs 108, 110, 112, and/or 114) to generate one or more usage statistics. For instance, as discussed above, the software applications and services that are available for use on a UE or set of UEs may be grouped into two or more distinct groupings, where each grouping may include at least one software application or service. The usage monitor 118 may collect individual usage information (e.g., minutes used during the current day) for each software application or service. The usage monitor 118 may also aggregate the usage information for software applications or services belonging to the same grouping to generate usage information for each grouping (e.g., minutes used during the current day).

The rules engine 124 determines when a user's request for additional access (e.g., usage time) for a software application or service belonging to a first grouping of software applications or services can be granted, based on the user's usage of a second grouping of software applications and services. This determination may be made using data computed by the usage monitor 118. For instance, in one case, additional usage time for the first grouping can be unlocked if the user's usage of the second grouping has met a predefined threshold. In one example, when the rules engine 124 determines that the request can be granted, the rules engine 124 may generate an instruction that instructs the user's UE(s) to unlock some predefined amount of additional time (e.g., another fifteen minutes, another hour, etc.). In one example, when the rules engine 124 determines that the request cannot be granted the rules engine 124 may generate a message to be displayed on the user's UE(s) that indicates that the request cannot be granted. The message may further indicate how much more time the user must spend using software applications and services included in the second grouping in order to meet the predefined threshold (e.g., another x minutes).

In one example, the DB 106 may store profiles for individual users of the UEs 108, 110, 112, and/or 114. The profile for a user may define two or more groupings of software applications that are accessible to the user via the UEs 108, 110, 112, and/or 114, as well as one or more rules that manage access to the software applications based on the groupings. For instance, a user's profile may specify that the user is allotted one hour of access per day to software applications in a first grouping, and that access to the first grouping is locked for the rest of the day once the user has exhausted that one hour of access. However, the user may unlock additional access to the software applications in the first grouping by meeting a usage goal for a second grouping. For instance, if the user uses any combination of software applications belonging to the second grouping for at least one hour during the day, then an additional one hour of access to the first grouping may be automatically unlocked. A rule may be applied over a fixed window of time, and may reset for the fixed window of time according to a predefined schedule. For instance, the fixed window of time may be one day. In this case, the rule may apply to usage of the groupings over one day (e.g., twenty-four hour period). Once a new day begins (e.g., 12:00 AM the next day), the rule may reset. Thus, for instance, even if the user exhausts the one hour of access to the first grouping on Monday, a new one hour of access to the first grouping may be available to the user on Tuesday, without the user having to meet a usage goal for the second grouping. Moreover, any progress made on Monday toward the usage goal for the second grouping may reset to zero on Tuesday.

The profile for a user may also store data provided by one or more of the UEs 108, 110, 112, and 114 that indicate the user's usage of various software applications and groupings of software applications on the UEs 108, 110, 112, and 114. For instance, the user profile may store data from all of the user's UEs that indicates how much time the user has spent using software applications belonging to different groupings of software applications. The user profile may also indicate how much more time the user needs to spend using software applications belonging to one grouping in order to unlock access to software applications belonging to another grouping. For instance, a user's profile may indicate that the user needs to spend sixty minutes using software applications in a second grouping in order to unlock thirty minutes of access to software applications in a first grouping. The user's profile may further indicate that the user has, during the current day, used the software applications in the second grouping for forty-five minutes so far. In a further example, the user profile may record a history of the user's requests for access to different groupings of software applications. The history may reset after some defined window of time (e.g., at 12:00 AM each day). For instance, a user's profile may show that the user has requested additional access to applications belonging to a first software grouping twice during the current day, and that the first request did not result in the access being granted, but the second request did result in the access being granted.

In one example, a user's profile may be modified at any time to update the rules and/or groupings of software applications, e.g., by the user himself, the user's parent or caregiver, or another individual. In a further example, several "child" user profiles may be accessible through a common "parent" profile that is authorized to make modifications to the child profiles. User profiles may be encrypted to protect sensitive data. In one example, the DB 106 may be implemented as a plurality of distributed database clusters.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
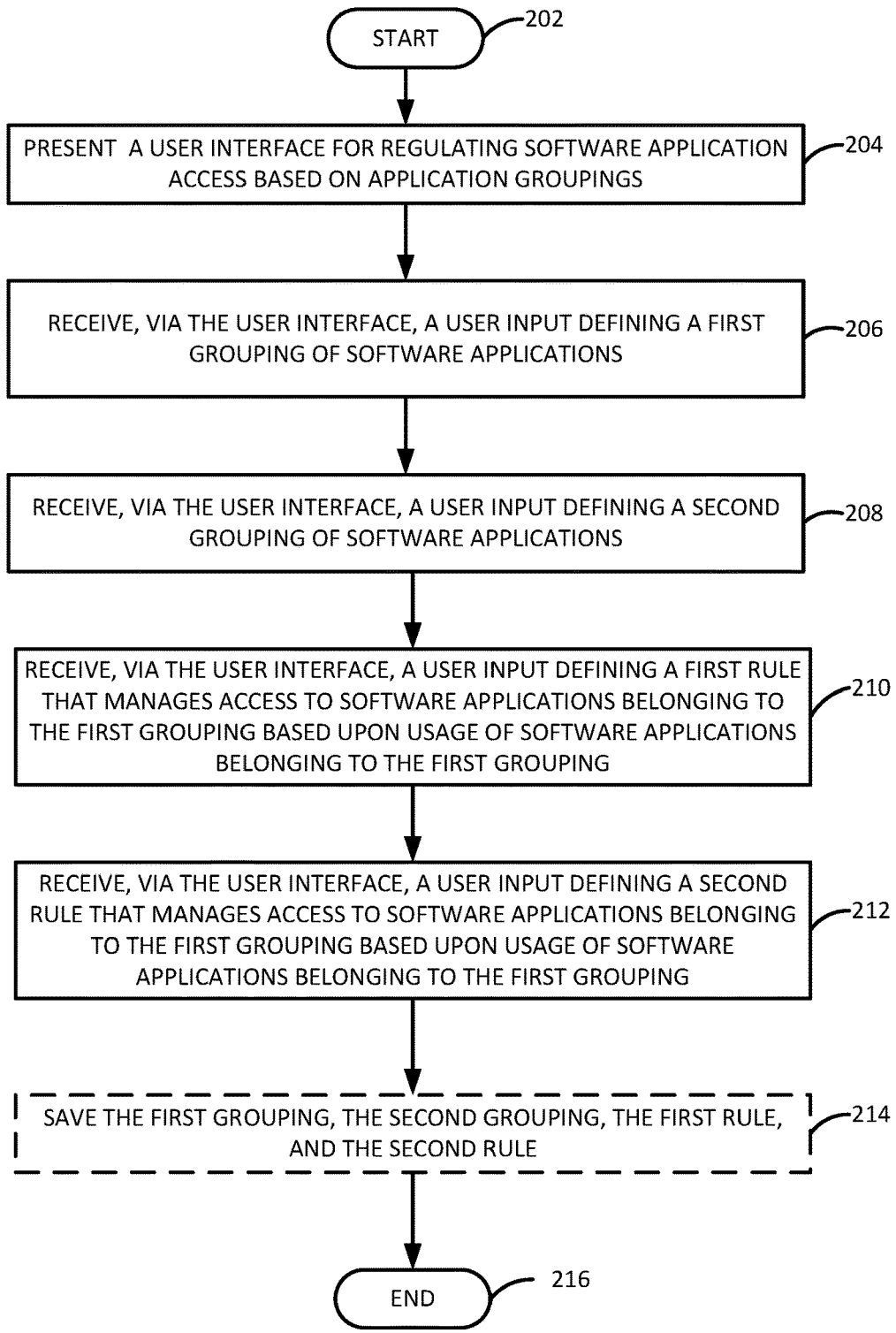
FIG. 2 illustrates a flowchart of a first example method for managing software application access based on application groupings.

To further aid in understanding the present disclosure, FIG. 2 illustrates a flowchart of a first example method 200 for managing software application access based on application groupings. In one example, the method 200 may be performed locally by a user endpoint device, such as one of the UEs 108, 110, 112, or 114 of FIG. 1. In another example, the method 200 could be performed by an application server, such as AS 104, that accesses data from one or more user endpoint devices of a user. In another example, the method 200 could be performed by a combination of a user endpoint device and an application server (e.g., with the user endpoint device performing some of the steps and the application server performing the rest of the steps). In another example still, the method 200 may be performed by a computing device, such as the computing device 800 illustrated in FIG. 8. For the sake of example, the method 200 is described as being performed by a processing system, which may in some examples be a processing system of a user endpoint device or a processing system of an application server.

The method 200 begins in step 202. In step 204, the processing system may present a user interface for managing software application access based on application groupings. For instance, the user interface may be a graphical user interface that is presented via the display of a user endpoint device, such as a tablet computer, a mobile phone, or the like.

In step 206, the processing system may receive, via the user interface, a user input defining a first grouping of software applications. The first grouping of software applications includes at least one software application that is accessible via one or more user endpoint devices (which may or may not include the user endpoint device on which the user interface is being displayed). For instance, the first grouping of software applications may comprise a subset of the software applications that are accessible via the one or more user endpoint devices.

In one example, the user interface may provide a mechanism by which the user may drag and drop icons for one or more software applications into a defined space on the display for the first grouping; any software applications corresponding to icons that are dragged into the defined space will be considered to belong to the first grouping. In another example, the user interface may present a window for the first grouping within which all of the software applications that are accessible via the one or more user endpoint devices may be listed. In this case, the user may check a box next to a software application name or icon, whereby checking the box indicates that the corresponding software applications belongs to the first grouping.

In one example, all of the software applications belonging to the first grouping may share some sort of common characteristic. For instance, all of the software applications belonging to the first grouping may be considered entertainment-related software applications (e.g., video and/or music streaming, gaming, social media, etc.). However, the first grouping may be defined by the user in any manner that the user deems suitable for his or her purposes.

In step 208, the processing system may receive, via the user interface, a user input defining a second grouping of software applications. The second grouping of software applications, like the first grouping, includes at least one software application that is accessible via the one or more user endpoint devices. For instance, the second grouping of software applications may comprise a subset of the software applications that are accessible via the one or more user endpoint devices.

In one example, the second grouping of software applications may be defined via the same mechanism as the second grouping of software applications (e.g., drag and drop, check box, and/or other mechanisms).

In one example, all of the software applications belonging to the second grouping may share some sort of common characteristic. For instance, all of the software applications belonging to the second grouping may be considered educational software applications (e.g., math, literacy, language learning, etc.). However, the second grouping may be defined by the user in any manner that the user deems suitable for his or her purposes.

In step 210, the processing system may receive, via the user interface, a user input defining a first rule that manages access to the software applications belonging to the first grouping. In one example, the first rule may define a limit on the usage of the software applications belonging to the first grouping. The limit any apply to a specific user of the one or more user devices, and may apply across any combination of the one or more user devices. Moreover, the limit may apply over a defined window of time, which may reset according to a defined schedule. For instance, the limit may specify that a particular user (or that the one or more user devices, where the one or more user devices belong to or are accessible to the particular user) is limited to one hour of access, per day, to the software applications belonging to the first grouping (e.g., one hour of total usage of any combination of software applications belonging to the first grouping). The limit may reset each day at 12:00 AM.

In step 212, the processing system may receive, via the user interface, a user input defining a second rule that manages access to the software applications belonging to the first grouping based upon usage of the software applications belonging to the second grouping. In one example, the second rule may define a usage goal for the second grouping of applications, where meeting the usage goal may unlock additional access to the software applications in the first grouping of applications (e.g., in addition to any access granted by the first rule). For instance, continuing the example where the first rule limits access to the first grouping to one hour per day, the second rule may grant an additional one hour of access to the first grouping when the user uses any combination of the software applications in the second grouping for at least one hour during the same day.

In step 214, the processing system may save the first grouping, the second grouping, the first rule, and the second rule. In one example the first grouping, the second grouping, the first rule, and the second rule may be saved to a user profile for the user of the one or more user devices. The user profile may be stored on the user device of which the processing system is a part, on the one or more user devices, and/or in a remote database which may be accessible to an application server that communicates with the one or more user devices.

In step 216, the method 200 may end.

Although FIG. 2 discusses locking access to the software applications belonging to the first grouping based on a usage limit for the first grouping being met, it will be appreciated that the usage limit for the first grouping may be zero. In other words, the usage limit, usage goal, first rule, and second rule may be set so that no access to the first grouping is available to the first grouping until the usage goal for the second grouping is met. Put another way, in some cases the user may be given some initial amount of time to access the software applications belonging to the first grouping. Then, after that initial amount of access is exhausted, additional access may be unlocked by meeting a usage goal for a software applications belonging to a second grouping. But in other cases, the user may not be given any initial amount of time to access the software applications belonging to the first grouping; access to the software applications in the first grouping may only be available by meeting the usage goal.

Figure 3:
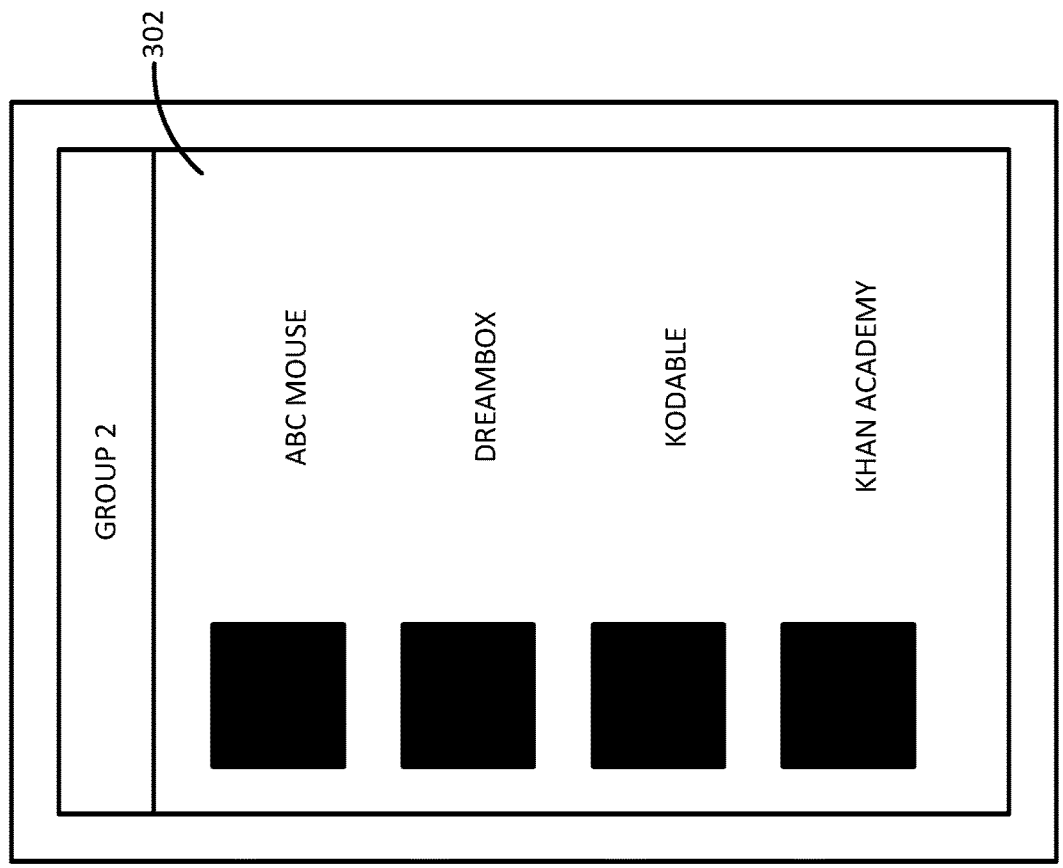
FIG. 3 illustrates one example of a graphical user interface that may be used to define groupings of software applications according to steps of the method of FIG. 2.
Figure 3:
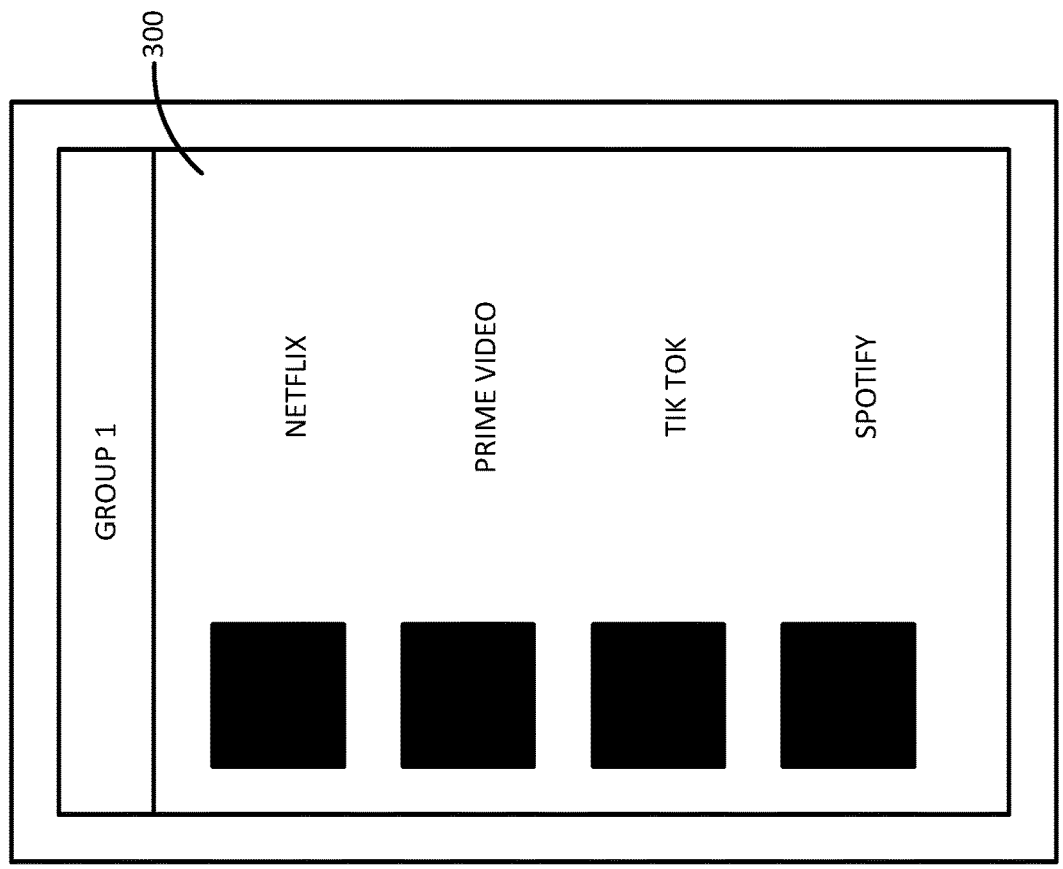

FIG. 3 illustrates one example of a graphical user interface that may be used to define groupings of software applications, e.g., according to steps 206 and 208 of the method 200 of FIG. 2. In particular, FIG. 3 illustrates two groupings of software applications: a first grouping 300 and a second grouping 302. However, it should be noted that any number of groupings of software applications may be defined as disclosed herein.

As illustrated, the first grouping 300 may be defined to include a plurality of software applications which may be accessible via one or more user endpoint devices belonging to a user. For instance, the user may be a child, and the one or more user endpoint devices may comprise a tablet computer belonging to the child. The first grouping 300 may include a first subset of the software applications accessible via the tablet computer. In one example, the first grouping 300 may include entertainment-related software applications (e.g., Netflix, Amazon Prime Video, Tik Tok, Spotify, and/or other applications). Although the example first grouping 300 shows four software applications belonging to the first grouping 300, the first grouping 300 may comprise any number of software applications (e.g., as few as one software application and as many as n−1 software applications, where n is the total number of software applications accessible via the user endpoint device).

As further illustrated, the second grouping 302 may be defined to include another plurality of software applications which may be accessible via the one or more user endpoint devices belonging to the user. Thus, continuing the example above, the second grouping 302 may include a second subset of the software applications accessible via the tablet computer, where the second subset does not overlap with the first subset. In one example, the second grouping 302 may include educational software applications (e.g., ABC Mouse, DreamBox, Kodable, Khan Academy, and/or other applications). Although the example second grouping 302 shows four software applications belonging to the second grouping 302, the second grouping 302 may comprise any number of software applications (e.g., as few as one software application and as many as n−1 software applications).

Figure 4:
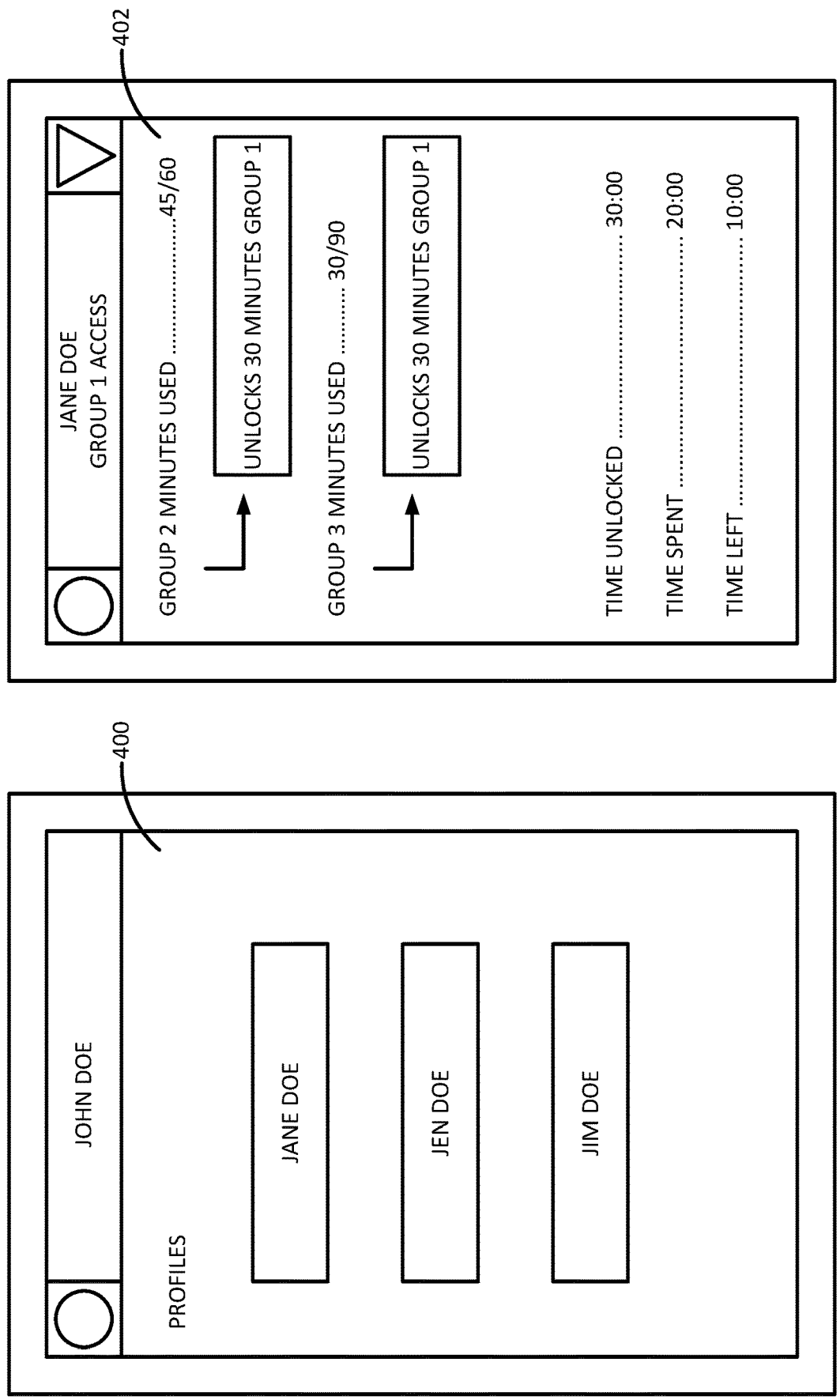
FIG. 4 illustrates one example of a graphical user interface that may be used to define rules that manage access to software applications based on groupings of software applications according to steps of the method of FIG. 2.

FIG. 4 illustrates one example of a graphical user interface that may be used to define rules that manage access to software applications based on groupings of software applications, e.g., according to step 212 of the method 200 of FIG. 2.

As illustrated, the graphical user interface may include a first display 400 which allows a user to select a child profile that is associated with a parent profile. For example, a user "John Doe" may have three children, "Jane Doe," "Jen Doe," and "Jim Doe." The first display 400 may allow John Doe to select a profile any one of his children in order to manage access, by the selected child, to software applications.

Selection of one of the child profiles, e.g., the profile for Jane Doe, may bring up a second display 402. The second display 402 may allow John Doe to define one or more rules by which access to a first grouping of software applications ("Group 1") may be managed. For instance, the second display 402 may be used to define a first rule whereby an additional thirty minutes of access to Group 1 may be unlocked when Jane Doe uses sixty minutes of any combination of software applications in a second grouping ("Group 2) and/or to define a second rule whereby an additional thirty minutes of access to Group 1 may be unlocked when Jane Doe uses ninety minutes of any combination of software applications in a third grouping ("Group 3"). The display may also track Jane Doe's progress toward unlocking additional access to Group 1 (e.g., forty-five of sixty minutes spent using software applications in Group 2, thirty of ninety minutes spent using software applications in Group 3, etc.).

In a further example the second display 402 may also track Jane Doe's history of unlocking additional access to Group 1. For instance, the display 402 may show how much additional access to Group 1 has been unlocked by Jane Doe during the current day (e.g., thirty minutes), how much of the additional access has been used so far (e.g., twenty minutes), and/or how much of the additional access remains before access to Group 1 is once again locked (e.g., ten minutes). Although FIG. 4 illustrates display of this information in text form, the information could alternatively be presented as a pie chart, a bar graph, a numerical rate or percentage, or in another format.

Any of the groupings and rules illustrated in FIGS. 3 and 4 may be modified at any time. For instance, software applications may be added to or removed from groupings (e.g., as new applications are downloaded to and/or old applications are deleted from the one or more user devices). Additionally, rules managing access to groupings may be modified. For instance, if usage of a second predefined amount of time of a second grouping unlocks access to a first predefined amount of time of a first grouping, the first predefined amount of time and/or the second predefined amount of time may be shorted or lengthened.

Figure 5:
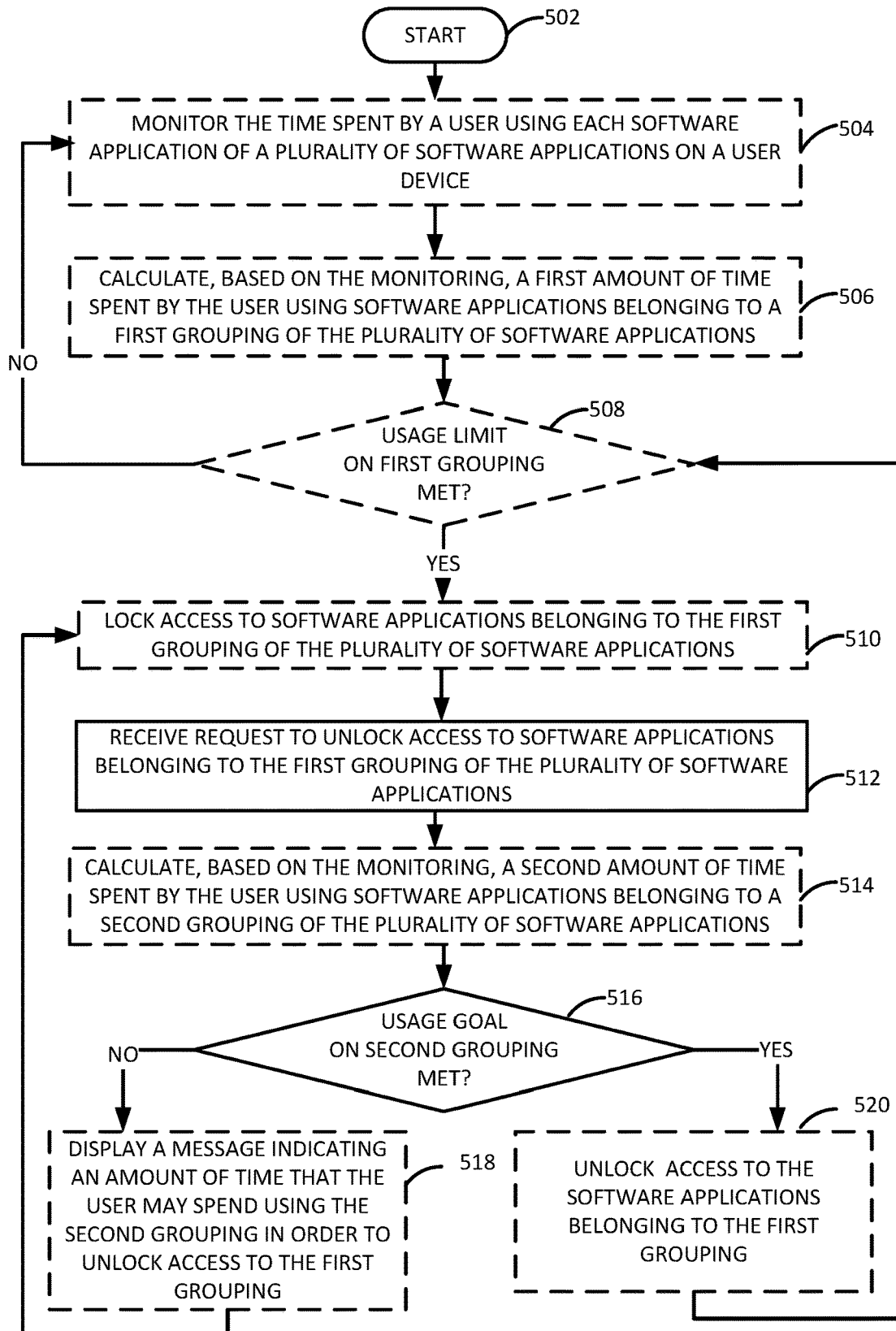
FIG. 5 illustrates a flowchart of an example method for managing access to software applications based on application groupings

FIG. 5 illustrates a flowchart of an example method 500 for managing access to software applications based on application groupings. In one example, at least some steps of the method 500 may be performed locally by a user endpoint device, such as one of the UEs 108, 110, 112, or 114 of FIG. 1. In another example still, the method 500 may be performed by a computing device, such as the computing device 800 illustrated in FIG. 8. For the sake of example, the method 500 is described as being performed by a processing system, which may in some examples be a processing system of a user endpoint device.

The method 500 begins in step 502. In optional step 504 (illustrated in phantom), the processing system may monitor the time spent by a user using each software application of a plurality of software applications on a user device. The user device may comprise, for example, a mobile phone, a tablet computer, a laptop or desktop computer, a gaming console or portable gaming device, or the like. The software applications may comprise a plurality of different types of software applications that may be installed on or otherwise accessible via the user device, such as streaming video applications, streaming music applications, gaming applications, social media applications, health and wellness applications, educational applications (e.g., applications that teach math, literacy, languages, coding and computer programming, science, and the like), communication applications (e.g., voice calling applications, video chat applications, short messaging service or similar applications), ecommerce applications, and/or other applications.

In one example, the processing system may monitor the time spent using each of these software applications by utilizing a clock function of the user device. The clock function may allow the processing system to determine, for example, the number of minutes that the user has spent using each software application. In one example, the time spent using each software application may be monitored over a defined window of time, such as one day. For instance, the processing system may maintain a counter associated with each software application of the plurality of software applications. Each day at 12:00 AM local time, all of the counters may reset to zero. For the next twenty-four hours, each counter may then keep a count of the amount of time (e.g., number of minutes) that a corresponding software application was used by the user. In one example, the counter corresponding to a software application will not increase unless the software application is being actively used by the user.

In one example, a software application may be determined to be actively used by the user if the software application is open and is the software application that is currently in view on the user device. For instance, the user device may be capable of opening or running multiple software applications at once. However, some of these multiple software applications may be running in the background. For instance, the user may have a math learning application open on the user device, but may currently be watching a streaming video application in full-screen mode on the user device, such that the math learning application is not visible. In one example, if a software application is open or running, but is not in view on the screen of the user device, then the counter corresponding to the software application may be paused (i.e., may not increment to show use of the software application).

In another example, some software applications may be determined to be actively used by the user if the user provides inputs to the software applications. For instance, a math learning application may require the user to answer math problems. If the math learning application is open and is visible on the screen of the user device, but has not received a user input within some threshold period of time (e.g., within x seconds of presenting a math problem that requires an answer from the user), then the counter corresponding to the math learning application may be paused. Similarly, a literacy application may require the user to "turn" the pages of an electronic book. If the literacy application is open and is visible on the screen of the user device, but the user has not turned a page within some threshold period of time (e.g., within x seconds of the last page turned), then the counter corresponding to the literacy application may be paused. In some cases, where a software application may not lend itself to the receipt of regular user inputs, the software application may periodically or randomly prompt the user to confirm that he or she is currently using the software application (e.g., by presenting a dialog box that asks the user to click a button).

In one example, multiple users may have access to the same user device (e.g., as in the case of family members or classmates who share a tablet computer, for instance). In this case, each user may sign into a respective profile or account to use the user device. Separate counters may be maintained for each user who has a profile on the user device. For instance, referring back to FIG. 4, Jane Doe, Jen Doe, and Jim Doe may each have a respective profile on a shared tablet computer. Jane Doe's profile may maintain a first set of counters that monitors her usage of the plurality of software applications, while Jen Doe's profile may maintain a separate second set of counters that monitors her usage of the same plurality of software applications. In this way, one user's usage of a software application will not be inadvertently attributed to another user.

In optional step 506 (illustrated in phantom), the processing system may calculate, based on the monitoring performed in step 504, a first amount of time spent by the user using software applications belonging to a first grouping of the plurality of software applications. For instance, as discussed above, the plurality of software applications may be grouped into two or more groupings of software applications (e.g., a first grouping and a second grouping, at least), where each grouping of software applications may include at least one software application of the plurality of software applications. In one example, there may be no overlap between groupings (e.g., an application may not belong to more than one grouping). Thus, for instance, the first grouping of software applications may include a plurality of entertainment-related software applications (e.g., similar to Group 1 in FIG. 3).

In one example, calculating the first amount of time may involve summing the individual amounts of time spent by the user using the software applications belonging to the first grouping. For instance, if the user spent thirty minutes using a streaming video application that belongs to the first grouping, ten minutes using a gaming application that belongs to the first grouping, and has not used any other software applications belonging to the first grouping, then the first amount of time may equal forty minutes. As discussed above, the first amount of time may be calculated over a defined window of time, such as one day. Thus, the forty minutes spent using the software applications belonging to the first grouping may indicate that the user has spent forty minutes today using software applications in the first grouping. However, at 12:00 AM, the first amount of time may reset to zero.

In one example, the first amount of time is calculated constantly (e.g., as a running clock). In another example, the first amount of time may be calculated periodically (e.g., every x minutes). For instance, although the counters may increment constantly as the plurality of software applications are used, the counter values for the software applications belonging to the same grouping may be summed only occasionally. In another example, the first amount of time may be calculated in response to an event, such as a request from the user, a new software application belonging to the first grouping being run, or the like.

In step 508, the processing system may determine, based on the calculating, whether a usage limit on the first grouping has been met. As discussed above, some groupings of software applications may be associated with rules that limit the amounts of time for which a user is permitted to use software applications belonging to those groupings. For instance, if the first grouping includes a plurality of entertainment-related applications, then a first rule may be associated with the first grouping that limits the user to one hour of time per day using any combination of software applications belonging to the first grouping. When the user has spent one hour using any combination of software applications belonging to the first grouping, then the usage limit may be said to have been met. As discussed above, the usage limit may apply to a defined window of time, such as one day. Thus, for instance, at 12:00 AM, the usage limit may reset such that any time previously spent using the software applications belonging to the first grouping does not count toward the reset usage limit.

If the processing system determines in step 508 that the usage limit has not been met, then the method 500 may return to step 504, and the processing system may continue to monitor the time spent by the user using each software application of the plurality of software applications. If, on the other hand, the processing system determines in step 508 that the usage limit has been met, then the method 500 may proceed to step 510.

In optional step 510 (illustrated in phantom), the processing system may lock access to the software applications belonging to the first grouping. In other words, the processing system may prevent the user from opening and/or running any software applications belonging to the first grouping. Thus, if the user attempts to open and/or run a software application belonging to the first grouping after access has been locked, the processing system may present a message on the display of the user device indicating that access to the software application is locked. As discussed above, the user may be one of multiple users who have access to the same user device. In this case, access to the software applications belonging to the first grouping may be locked for the user, but not necessarily for the other users (assuming that the other users have not met their respective usage limits).

In step 512, the processing system may receive a request from the user to unlock access to the software applications belonging to the first grouping. In one example, the request may comprise an attempt by the user to open and/or run a software application belonging to the first grouping. In another example, when the user attempts to open and/or run a software application belonging to the first grouping, the processing system may present a message or dialog that informs the user that access to software applications belonging to the first grouping is locked. The message or dialog may ask the user if he or she would like to request that access to the software applications belonging to the first grouping be unlocked, and the request may comprise the selection of an affirmative response.

In optional step 514 (illustrated in phantom), the processing system may calculate, based on the monitoring, a second amount of time spent by the user using software applications belonging to a second grouping of the plurality of software applications. For instance, if the first grouping includes entertainment-related software applications, the second grouping may include educational software applications (e.g., similar to Group 2 of FIG. 3). The calculation performed in step 514 may be performed in a similar manner to the calculation performed in step 506. For instance, calculating the second amount of time may involve summing the individual amounts of time spent by the user using the software applications belonging to the second grouping. As discussed above, the second amount of time may be calculated over a defined window of time, such as one day.

In one example, the second amount of time is calculated constantly (e.g., as a running clock). In another example, the second amount of time may be calculated periodically (e.g., every x minutes). In another example, the second amount of time may be calculated in response to an event, such as a request from the user, a new software application belonging to the second grouping being run, or the like.

In step 516 (illustrated in phantom), the processing system may determine, based on the calculating, whether a usage goal on the second grouping has been met. For instance, if the second grouping includes a plurality of educational applications, then a second rule may be associated with the second grouping that permits additional access to be unlocked for the first grouping when the user uses any combination of software applications belonging to the second grouping for at least a predefined period of time. Thus, for example, a second rule may specify that when the user spends sixty minutes using any combination of software applications belonging to the second grouping, the user may unlock an additional thirty minutes of access to the software applications belonging to the first grouping. When the user has spent one hour using any combination of software applications belonging to the second grouping, then the usage goal may be said to have been met. In one example the additional access that is unlocked may be temporary or limited to a specific period of time (e.g., one hour). That is, meeting the usage goal for the second grouping may not unlock access to the first grouping indefinitely. In another example, the time for which the additional access is unlocked may be limited to use during a defined window of time (e.g., the current day), such that if any time of the additional access is not used during the defined window of time, the unused time does not "roll over" to a next window of time (e.g., the next day). As discussed above, the usage goal may apply to a defined window of time, such as one day. Thus, for instance, at 12:00 AM, the usage goal may reset such that any time previously spent using the software applications belonging to the second grouping does not count toward the reset usage goal.

If the processing system determines in step 516 that the usage goal has not been met, then the method 500 may proceed to step 518. In optional step 518 (illustrated in phantom), the processing system may display a message (e.g., on the display of the user device) indicating an amount of time that the user may spend using software applications belonging to the second grouping in order to unlock access to the software applications belonging to the first grouping. The amount of time may be calculated in accordance with the second rule discussed above. For instance, if a second rule allows additional access to the software applications in the first grouping to be unlocked when the user uses software applications belonging to the second grouping for some threshold period of time, then the amount of time displayed in step 518 may comprise the difference between the threshold amount of time and the amount of time that the user has spent using any combination of software applications belonging to the second grouping. For instance, if the additional access may be unlocked when the user uses the software applications belonging to the second grouping for sixty minutes, and the user has used the software applications belonging to the second grouping for forty-five minutes so far during the current day, then the message displayed in step 518 may indicate that access to the first grouping can be unlocked when the user spends fifteen more minutes of time using the software applications in the second grouping.

Once the message is displayed, the method 500 may return to step 510, and the processing system may continue to lock access to the software applications belonging to the first grouping. If, on the other hand, the processing system determines in step 516 that the usage goal has been met, then the method 500 may proceed to step 520.

In optional step 520 (illustrated in phantom), the processing system may unlock access to the software applications belonging to the first grouping. As discussed above, the additional access to the first grouping that is unlocked may comprise a defined or limited period of time (e.g., one hour) rather than an unlimited amount of time. When the access to the first grouping is unlocked, the first user may be able to open and/or run the software applications belonging to the first grouping for the defined or limited period of time.

Once the access is unlocked in step 520, the method 500 may return to step 508, and the processing system may determine, as discussed above, whether the usage limit on the first grouping has been met. In one example, unlocking of additional access to the first grouping in step 520 resets the usage limit. For instance, if one additional hour of access to the first grouping is unlocked in step 520, then the usage limit on the first grouping may be increased by one hour. When the additional one hour of access is used, then the processing system may again lock access to the first grouping as discussed in connection with step 510.

Thus, the method 500 allows a user device to monitor a user's usage of different groupings of software applications and to automatically unlock access certain groupings of software applications (for which access time may be limited) when usage goals for other software applications are met. Thus, a parent may configure the groupings and rules so that in order to gain additional access to a grouping of entertainment-related applications, a child must spend a threshold amount of time using applications in another grouping of educational applications. For instance, to automatically unlock an additional thirty minutes of a gaming application, the child may spend sixty minutes using a math application. This controls the amount of screen time that is dedicated to less beneficial applications and encourages screen time that is dedicated to more beneficial applications, without necessarily having to solicit permission from the parent every time the child wishes to unlock additional access to the less beneficial applications.

In some examples, the processing system may generate a report that summarizes the user's time spent using all software applications of the plurality of software applications. The report may summarize the usage over a defined window of time (e.g., one day). For instance, an individual other than the user (such as a parent) may access a report at the end of each day that shows how much time the user spent, during that day, using each software application on the user device. This visibility into the user's usage of the software applications may help the individual to better tailor the groupings and rules to meet certain goals. For instance, if a parent determines that a child is unlocking too much additional access to a given grouping of applications (e.g., in one day, the child unlocked an additional hour of access to a gaming application three times, for a total of three additional hours), then the parent may increase the amount of time that the child must spend using other groupings in order to unlock the additional access (e.g., may increase a usage goal for a grouping of educational applications from one hour to ninety minutes).

Figure 6:
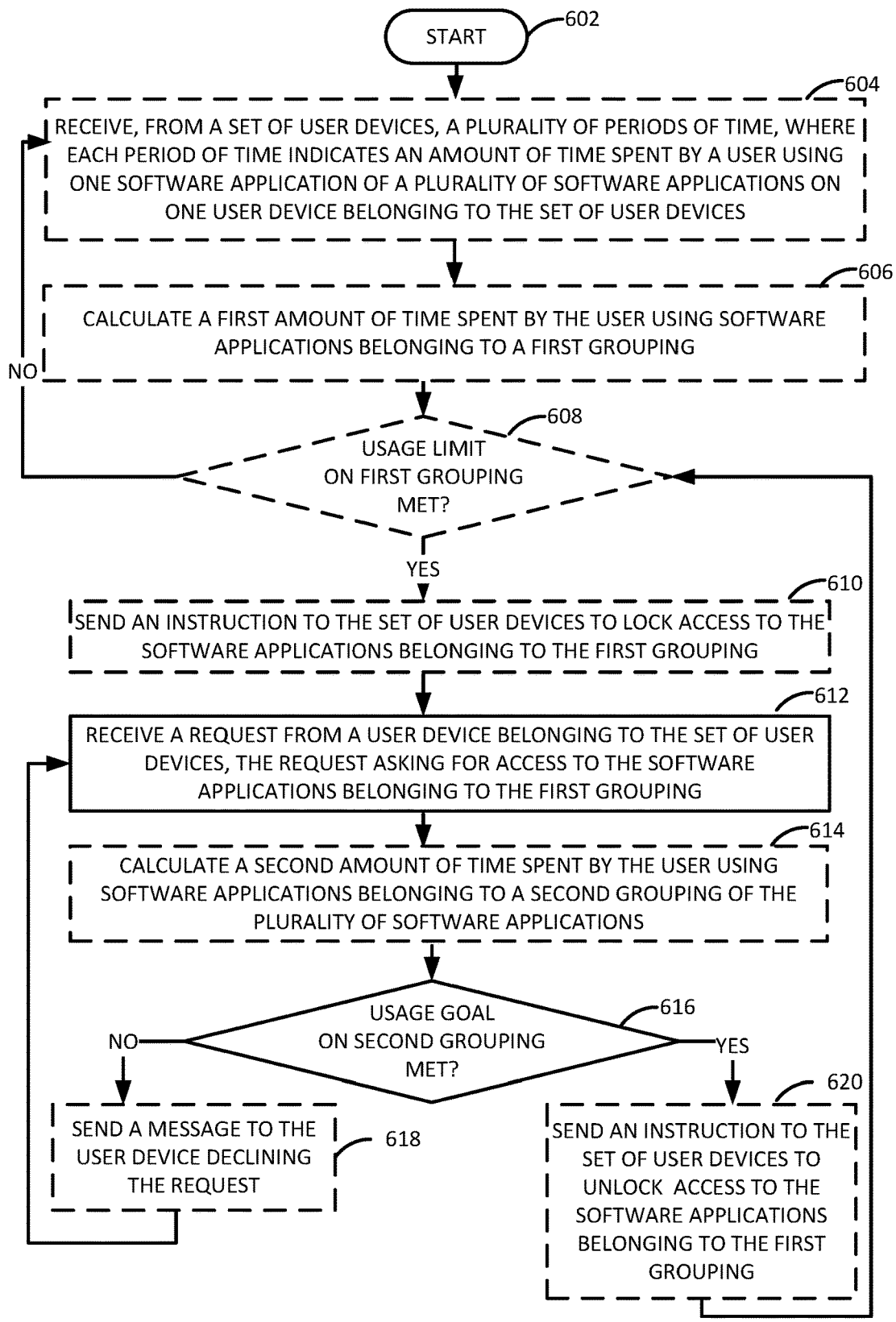
FIG. 6 illustrates a flowchart of an example method for managing access to software applications based on application groupings.

FIG. 5 presents a method by which a user device may locally monitor a user's time spent using a plurality of software applications and may autonomously control the user's access to different groupings of the plurality of applications based on the local monitoring and enforcement of rules relating to the groupings. However, in other examples, the user device may send individual application usage information to a remote device, such as an application server, where the application server may calculate the usage according to groupings and may send instructions to the user device to enforce the rules. The assistance of the application server may be desirable, for instance, in situations where a user may have access to multiple user devices. For instance, the user may have access to a mobile phone, a tablet computer, and a smart television, where the mobile phone, the tablet computer, and the smart television may run many of the same software applications. In this case, a parent may wish to ensure that a child does not circumvent usage limits on certain groupings of software applications (e.g., streaming video and gaming applications) by simply switching to a different device (e.g., switching to the smart television when the usage limit is reached on the tablet computer). A centralized monitoring entity, such as an application server, may collect software application usage data from all of the user's devices and may send signals to all of the user's devices in order to make sure that the rules are enforced across all of the user's devices. FIG. 6, discussed in further detail below, describes an approach in which an application server helps to manage the access to the software applications based on the application groupings.

FIG. 6 illustrates a flowchart of an example method 600 for managing access to software applications based on application groupings. In one example, at least some steps of the method 600 may be performed by an application server in a core network (or in "the cloud"), such as the AS 104 of FIG. 1. In another example still, the method 600 may be performed by a computing device, such as the computing device 800 illustrated in FIG. 8. For the sake of example, the method 600 is described as being performed by a processing system, which may in some examples be a processing system of a user endpoint device.

The method 600 begins in step 602. In optional step 604 (illustrated in phantom), the processing system may receive, from a set of user devices, a plurality of periods of time, where each period of time of the plurality of periods of time indicates an amount of time spent by a user using one software application of a plurality of software applications on one user device belonging to the set of user devices. In one example, the set of user devices may include at least one user device that is accessible to the user and that is capable of running software applications. For instance, the user may have access to a mobile phone, a tablet computer, a laptop or desktop computer, a gaming console or portable gaming device, and/or the like. The software applications may comprise a plurality of different types of software applications that may be installed on or otherwise accessible via the user devices, such as streaming video applications, streaming music applications, gaming applications, social media applications, health and wellness applications, educational applications (e.g., applications that teach math, literacy, languages, coding and computer programming, science, and the like), communication applications (e.g., voice calling applications, video chat applications, short messaging service or similar applications), ecommerce applications, and/or other applications.

In one example, each period of time received in step 602 corresponds to one combination of user device and software application. For instance, a single period of time may represent the time spent by the user using a video chat application on a mobile phone, or a gaming application on a tablet computer, or a streaming video application on a smart television. Each user device may utilize a clock function, as discussed above, to monitor the time spent using each software application. The time spent using a software application may be reported in terms of minutes, hours, or other units of time. As discussed above, the reported periods of time may comprise time during which a software application was determined to be actively used by the user, where active use of a software application may be determined by the user devices according to any of the methods discussed above, or by other methods.

In one example, the plurality of periods of time may be reported by the plurality of user devices periodically (e.g., every x minutes). In another example, the plurality of periods of time may be reported in response to certain predefined events, such as a request by the processing system, the plurality of user devices being powered on, new software applications being opened and/or run on the plurality of user devices, requests from the user, and/or other events.

In one example, the time spent using each software application may be reported over a defined window of time, such as one day. For instance, the processing system may maintain a counter associated with each software application of the plurality of software applications. Each day at 12:00 AM local time, all of the counters may reset to zero. For the next twenty-four hours, each counter may then keep a count of the amount of time (e.g., number of minutes) that a corresponding software application was used by the user. For instance, each time a user device reports usage of a software application over the next twenty-four hours, the counter for the software application may be incremented accordingly. In one example, separate counters may be maintained for each user who has a profile on the user devices, as discussed above. In this way, one user's usage of a software application will not be inadvertently attributed to another user.

In optional step 606 (illustrated in phantom), the processing system may calculate, based on the plurality of periods of time received in step 604, a first amount of time spent by the user using software applications belonging to a first grouping of the plurality of software applications. For instance, as discussed above, the plurality of software applications may be grouped into two or more groupings of software applications (e.g., a first grouping and a second grouping, at least), where each grouping of software applications may include at least one software application of the plurality of software applications. In one example, there may be no overlap between groupings (e.g., an application may not belong to more than one grouping). Thus, for instance, the first grouping of software applications may include a plurality of entertainment-related software applications (e.g., similar to Group 1 in FIG. 3).

In one example, calculating the first amount of time may involve summing the individual amounts of time spent by the user using the software applications belonging to the first grouping, as discussed above. The first amount of time may be calculated over a defined window of time, such as one day (e.g., such that at 12:00 AM, the first amount of time may reset to zero).

In one example, the first amount of time is calculated constantly (e.g., as a running clock), as the plurality of periods of time are received. In another example, the first amount of time may be calculated periodically (e.g., every x minutes). For instance, although the counters may increment constantly as the plurality of software applications are used, the counter values for the software applications belonging to the same grouping may be summed only occasionally. In another example, the first amount of time may be calculated in response to an event, such as a request from the user, a new software application belonging to the first grouping being run, a new period of time being reported, or the like.

In step 608, the processing system may determine, based on the calculating, whether a usage limit on the first grouping has been met. As discussed above, some groupings of software applications may be associated with rules that limit the amounts of time for which a user is permitted to use software applications belonging to those groupings. For instance, if the first grouping includes a plurality of entertainment-related applications, then a first rule may be associated with the first grouping that limits the user to one hour of time per day using any combination of software applications belonging to the first grouping. When the user has spent one hour using any combination of software applications belonging to the first grouping, then the usage limit may be said to have been met. As discussed above, the usage limit may apply to a defined window of time, such as one day. Thus, for instance, at 12:00 AM, the usage limit may reset such that any time previously spent using the software applications belonging to the first grouping does not count toward the reset usage limit.

If the processing system determines in step 608 that the usage limit has not been met, then the method 600 may return to step 604, and the processing system may continue to receive a plurality of periods of time from the set of user devices. If, on the other hand, the processing system determines in step 608 that the usage limit has been met, then the method 600 may proceed to step 610.

In optional step 610 (illustrated in phantom), the processing system may send an instruction to the set of user devices to lock access to the software applications belonging to the first grouping. In other words, the processing system may instruct the set of user devices to prevent the user from opening and/or running any software applications belonging to the first grouping. Thus, if the user attempts to open and/or run a software application belonging to the first grouping on one of the user devices in the set of user devices after access has been locked, the user device may present a message (e.g., on its display) indicating that access to the software application is locked. If the user is one of multiple users who have access to the same set of user devices, the instruction may specify that access to the software applications belonging to the first grouping should be locked for the user, but not necessarily for the other users (assuming that the other users have not met their respective usage limits).

In step 612, the processing system may receive a request from a user device belonging to the set of user devices to unlock access to the software applications belonging to the first grouping. In one example, the request may comprise an indication by the user device that the user has attempted to open and/or run a software application belonging to the first grouping. In another example, when the request may comprise an indication that the user has explicitly requested access to the first grouping of software applications (e.g., by selecting an affirmative response to a message asking whether the user if would like to request that access to the software applications belonging to the first grouping be unlocked).

In optional step 614 (illustrated in phantom), the processing system may calculate, based on the plurality of periods of time received in step 604, a second amount of time spent by the user using software applications belonging to a second grouping of the plurality of software applications.

For instance, if the first grouping includes entertainment-related software applications, the second grouping may include educational software applications (e.g., similar to Group 2 of FIG. 3). The calculation performed in step 614 may be performed in a similar manner to the calculation performed in step 606. For instance, calculating the second amount of time may involve summing the individual amounts of time spent by the user using the software applications belonging to the second grouping. As discussed above, the second amount of time may be calculated over a defined window of time, such as one day.

In one example, the second amount of time is calculated constantly (e.g., as a running clock). In another example, the second amount of time may be calculated periodically (e.g., every x minutes). In another example, the second amount of time may be calculated in response to an event, such as a request from the user, a new software application belonging to the second grouping being run, the receipt of a new period of time, or the like.

In step 616 (illustrated in phantom), the processing system may determine, based on the calculating, whether a usage goal on the second grouping has been met. For instance, if the second grouping includes a plurality of educational applications, then a second rule may be associated with the second grouping that permits additional access to be unlocked for the first grouping when the user uses any combination of software applications belonging to the second grouping for at least a predefined period of time. In one example the additional access that is unlocked may be temporary or limited to a specific period of time (e.g., one hour). That is, meeting the usage goal for the second grouping may not unlock access to the first grouping indefinitely. In another example, the time for which the additional access is unlocked may be limited to use during a defined window of time (e.g., the current day), such that if any time of the additional access is not used during the defined window of time, the unused time does not "roll over" to a next window of time (e.g., the next day). As discussed above, the usage goal may apply to a defined window of time, such as one day. Thus, for instance, at 12:00 AM, the usage goal may reset such that any time previously spent using the software applications belonging to the second grouping does not count toward the reset usage goal.

If the processing system determines in step 616 that the usage goal has not been met, then the method 600 may proceed to step 618. In optional step 618 (illustrated in phantom), the processing system may send a message to the user device declining the request. In one example, the message may also indicate an amount of time that the user may spend using software applications belonging to the second grouping in order to unlock access to the software applications belonging to the first grouping. The amount of time may be calculated in accordance with the second rule discussed above. For instance, if a second rule allows additional access to the software applications in the first grouping to be unlocked when the user uses software applications belonging to the second grouping for some threshold period of time, then the amount of time included in the message may comprise the difference between the threshold amount of time and the amount of time that the user has spent using any combination of software applications belonging to the second grouping. Thus, although the processing system may decline the request to unlock access in step 618, the processing system may inform the user of how he or she may successfully unlock access.

Once the message is sent, the method 600 may return to step 612, and the processing system may wait for a next request for unlocking of access to be received. If, on the other hand, the processing system determines in step 616 that the usage goal has been met, then the method 600 may proceed to step 620.

In optional step 620 (illustrated in phantom), the processing system may send an instruction to the set of user devices to unlock access to the software applications belonging to the first grouping. As discussed above, the additional access to the first grouping that is unlocked may comprise a defined or limited period of time (e.g., one hour) rather than an unlimited amount of time. The instruction may define this limited period of time (e.g., unlock for one hour) When the access to the first grouping is unlocked, the first user may be able to open and/or run the software applications belonging to the first grouping for the defined or limited period of time.

Once the access is unlocked in step 620, the method 600 may return to step 608, and the processing system may determine, as discussed above, whether the usage limit on the first grouping has been met. In one example, unlocking of additional access to the first grouping in step 620 resets the usage limit. For instance, if one additional hour of access to the first grouping is unlocked in step 620, then the usage limit on the first grouping may be increased by one hour. When the additional one hour of access is used, then the processing system may again send an instruction to the set of user devices to lock access to the first grouping as discussed in connection with step 610.

Figure 7:
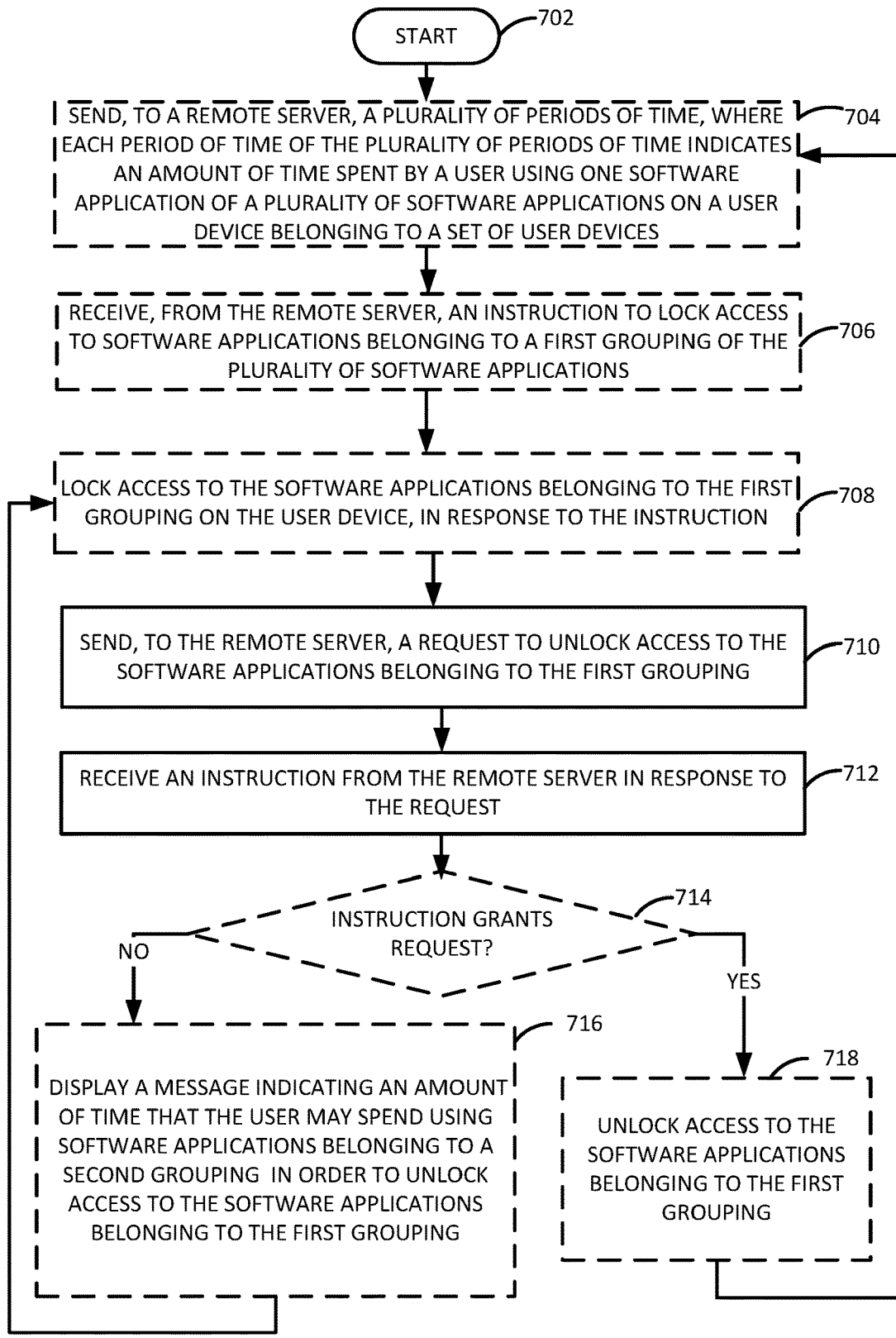
FIG. 7 illustrates a flowchart of an example method for managing access to software applications based on application groupings.

FIG. 7 illustrates a flowchart of an example method 700 for managing access to software applications based on application groupings. In one example, at least some steps of the method 700 may be performed locally by a user endpoint device, such as one of the UEs 108, 110, 112, or 114 of FIG. 1, which may send data to and receive instructions from a remote application server, such as AS 104 of FIG. 1. In another example still, the method 700 may be performed by a computing device, such as the computing device 800 illustrated in FIG. 8. For the sake of example, the method 700 is described as being performed by a processing system, which may in some examples be a processing system of a user endpoint device.

The method 700 begins in step 702. In optional step 704 (illustrated in phantom), the processing system may send, to a remote server, a plurality of periods of time, where each period of time of the plurality of periods of time indicates an amount of time spent by a user using one software application of a plurality of software applications on a user device of which the processing system is a part. In one example, the user device may belong to a set of user devices that report respective periods of time to the remote server. In one example, the user device is accessible to the user and is capable of running software applications. For instance, the user device may be a mobile phone, a tablet computer, a laptop or desktop computer, a gaming console or portable gaming device, and/or the like. The software applications may comprise a plurality of different types of software applications that may be installed on or otherwise accessible via the user device, such as streaming video applications, streaming music applications, gaming applications, social media applications, health and wellness applications, educational applications (e.g., applications that teach math, literacy, languages, coding and computer programming, science, and the like), communication applications (e.g., voice calling applications, video chat applications, short messaging service or similar applications), ecommerce applications, and/or other applications.

In one example, the processing system may monitor the time spent using each of these software applications by utilizing a clock function of the user device. The clock function may allow the processing system to determine, for example, the number of minutes that the user has spent using each software application. In one example, the time spent using each software application may be monitored over a defined window of time, such as one day. For instance, the processing system may maintain a counter associated with each software application of the plurality of software applications. Each day at 12:00 AM local time, all of the counters may reset to zero. For the next twenty-four hours, each counter may then keep a count of the amount of time (e.g., number of minutes) that a corresponding software application was used by the user. In one example, the counter corresponding to a software application will not increase unless the software application is being actively used by the user.

As discussed above, in one example, a software application may be determined to be actively used by the user if the software application is open and is the software application that is currently in view on the user device. However, if a software application is open or running, but is not in view on the screen of the user device, then the counter corresponding to the software application may be paused (i.e., may not increment to show use of the software application). In another example, some software applications may be determined to be actively used by the user if the user provides inputs to the software applications. In some cases, where a software application may not lend itself to the receipt of regular user inputs, the software application may periodically or randomly prompt the user to confirm that he or she is currently using the software application (e.g., by presenting a dialog box that asks the user to click a button).

The time spent using a software application may be reported in terms of minutes, hours, or other units of time. In one example, the plurality of periods of time may be sent to the remote server periodically (e.g., every x minutes). In another example, the plurality of periods of time may be sent to the remote server in response to certain predefined events, such as a request by the processing system, the user device being powered on, new software applications being opened and/or run on the user device, requests from the user, and/or other events.

In one example, the time spent using each software application may be reported over a defined window of time, such as one day. For instance, the processing system may maintain a counter associated with each software application of the plurality of software applications. Each day at 12:00 AM local time, all of the counters may reset to zero. For the next twenty-four hours, each counter may then keep a count of the amount of time (e.g., number of minutes) that a corresponding software application was used by the user. For instance, each time the user device reports usage of a software application over the next twenty-four hours, the counter for the software application may be incremented accordingly. In one example, separate counters may be maintained for each user who has a profile on the user device, as discussed above. In this way, one user's usage of a software application will not be inadvertently attributed to another user.

In optional step 706 (illustrated in phantom), the processing system may receive, from the remote server, an instruction to lock access to software applications belonging to a first grouping of the plurality of software applications. The instruction may be sent in response to the sending of the plurality of periods of time. For instance, as discussed in connection with the method 600, the remote server may calculate a first amount of time spent by the user using software applications belonging to the first grouping and may determine whether the first amount of time meets a predefined usage limit for the first grouping. As discussed above, calculating the first amount of time may involve summing the individual amounts of time spent by the user using the software applications belonging to the first grouping. The first amount of time may be calculated over a defined window of time, such as one day. At 12:00 AM, the first amount of time may reset to zero.

As also discussed above, the plurality of software applications may be grouped into two or more groupings of software applications (e.g., a first grouping and a second grouping, at least), where each grouping of software applications may include at least one software application of the plurality of software applications. In one example, there may be no overlap between groupings (e.g., an application may not belong to more than one grouping). Thus, for instance, the first grouping of software applications may include a plurality of entertainment-related software applications (e.g., similar to Group 1 in FIG. 3). Moreover, some groupings of software applications may be associated with rules that limit the amounts of time for which a user is permitted to use software applications belonging to those groupings. For instance, if the first grouping includes a plurality of entertainment-related applications, then a first rule may be associated with the first grouping that limits the user to one hour of time per day using any combination of software applications belonging to the first grouping. When the user has spent one hour using any combination of software applications belonging to the first grouping, then the usage limit may be said to have been met. As discussed above, the usage limit may apply to a defined window of time, such as one day. Thus, for instance, at 12:00 AM, the usage limit may reset such that any time previously spent using the software applications belonging to the first grouping does not count toward the reset usage limit.

In step 708, the processing system may lock access to the software applications belonging to the first grouping of software applications on the user device, in response to the instruction received in step 706. In other words, the processing system may prevent the user from opening and/or running any software applications belonging to the first grouping. Thus, if the user attempts to open and/or run a software application belonging to the first grouping after access has been locked, the processing system may present a message on the display of the user device indicating that access to the software application is locked. As discussed above, the user may be one of multiple users who have access to the same user device. In this case, access to the software applications belonging to the first grouping may be locked for the user, but not necessarily for the other users (assuming that the other users have not met their respective usage limits).

In optional step 710 (illustrated in phantom), the processing system may send, to the remote server, a request to unlock access to the software applications belonging to the first grouping. In one example, the request may be sent in response to an instruction by the user to send the request. For instance, when the user attempts to open and/or run a software application belonging to the first grouping, the processing system may present a message or dialog that informs the user that access to software applications belonging to the first grouping is locked. The message or dialog may ask the user if he or she would like to request that access to the software applications belonging to the first grouping be unlocked, and the request may comprise the selection of an affirmative response. In another example, the request may be sent in response to an attempt by the user to open and/or run a software application belonging to the first grouping.

In optional step 712 (illustrated in phantom), the processing system may receive an instruction from the remote server in response to the request that was sent in step 710. In one example, the instruction may instruct the processing system to take an action that either unlocks or continues to lock access to the software applications in the first grouping. For instance, if the instruction grants the request, the instruction may instruct the processing system to unlock access to the software applications in the first grouping for at least a defined period of time. If, however, the instruction declines the request, the instruction may instruct the processing system to continue locking access to the software applications in the first grouping.

In one example, the instruction may be formulated by the remote server based on a calculation of a second amount of time spent by the user using software applications belonging to a second grouping of the plurality of software applications (e.g., a usage goal). For instance, if the first grouping includes entertainment-related software applications, the second grouping may include educational software applications (e.g., similar to Group 2 of FIG. 3). The calculation performed by the remote server may involve summing the individual amounts of time spent by the user using the software applications belonging to the second grouping. As discussed above, the second amount of time may be calculated over a defined window of time, such as one day.

In one example, the second amount of time is calculated constantly by the remote server (e.g., as a running clock). In another example, the second amount of time may be calculated periodically (e.g., every x minutes). In another example, the second amount of time may be calculated in response to an event, such as a request from the user, a new software application belonging to the second grouping being run, or the like.

In one example, where the instruction declines the request, the instruction may further include an indication of an amount of time that the user may spend using software applications in the second grouping in order to unlock access to the applications in the first grouping.

In one example, if the access is granted, the access may be temporary or limited to a specific period of time (e.g., one hour). That is, meeting the usage goal for the second grouping may not unlock access to the first grouping indefinitely. In another example, the time for which the additional access is unlocked may be limited to use during a defined window of time (e.g., the current day), such that if any time of the additional access is not used during the defined window of time, the unused time does not "roll over" to a next window of time (e.g., the next day).

In step 714 (illustrated in phantom), the processing system may determine whether the instruction received in step 712 grants the request that was sent to the remote server in step 710 (e.g., whether or not access to the software applications in the first grouping is granted).

If the processing system determines in step 714 that the instruction does not grant the request, then the method 700 may proceed to step 716. In optional step 716 (illustrated in phantom), the processing system may display a message (e.g., on the display of the user device) indicating an amount of time that the user may spend using software applications belonging to the second grouping in order to unlock access to the software applications belonging to the first grouping. The amount of time may be calculated in accordance with the second rule discussed above. For instance, if a second rule allows additional access to the software applications in the first grouping to be unlocked when the user uses software applications belonging to the second grouping for some threshold period of time, then the amount of time displayed in step 716 may comprise the difference between the threshold amount of time and the amount of time that the user has spent using any combination of software applications belonging to the second grouping. For instance, if the additional access may be unlocked when the user uses the software applications belonging to the second grouping for sixty minutes, and the user has used the software applications belonging to the second grouping for forty-five minutes so far during the current day, then the message displayed in step 716 may indicate that access to the first grouping can be unlocked when the user spends fifteen more minutes of time using the software applications in the second grouping.

Once the message is displayed, the method 700 may return to step 708 and the processing system may continue to lock access to the software applications belonging to the first grouping. If, on the other hand, the processing system determines in step 714 that the instruction grants the request, then the method 700 may proceed to step 718.

In optional step 718 (illustrated in phantom), the processing system may unlock access to the software applications belonging to the first grouping. As discussed above, the additional access to the first grouping that is unlocked may comprise a defined or limited period of time (e.g., one hour) rather than an unlimited amount of time. When the access to the first grouping is unlocked, the first user may be able to open and/or run the software applications belonging to the first grouping for the defined or limited period of time.

Once the access is unlocked in step 718, the method 700 may return to step 704, and the processing system may continue to send the plurality of periods of time to the remote server as discussed above. In one example, unlocking of access to the first grouping in step 718 resets a usage limit for the software applications belonging to the first grouping. For instance, if one hour of access to the first grouping is unlocked in step 718, then the usage limit on the first grouping may be increased by one hour. When the one hour of access is used, then the processing system may again receive an instruction to lock access to the first grouping as discussed in connection with step 706.

Although not expressly specified above, one or more steps of the method 200, 500, 600, or 700 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2, 5, 6, or 7 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 8 depicts a high-level block diagram of a computing device specifically programmed to perform the functions described herein. For example, any one or more components or devices illustrated in FIG. 1 or described in connection with the methods 200, 500, 600, or 700 may be implemented as the system 800. For instance, a user endpoint device or an application server could be implemented as illustrated in FIG. 8.

As depicted in FIG. 8, the system 800 comprises a hardware processor element 802, a memory 804, a module 805 for managing software application access based on application groupings, and various input/output (I/O) devices 806.

The hardware processor 802 may comprise, for example, a microprocessor, a central processing unit (CPU), or the like. The memory 804 may comprise, for example, random access memory (RAM), read only memory (ROM), a disk drive, an optical drive, a magnetic drive, and/or a Universal Serial Bus (USB) drive. The module 805 for managing software application access based on application groupings may include circuitry and/or logic for performing special purpose functions relating to monitoring a user's use of groupings of software applications and unlocking access to certain groupings based on meeting usage goals for other groupings. The input/output devices 806 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 805 for managing software application access based on application groupings (e.g., a software program comprising computer-executable instructions) can be loaded into memory 804 and executed by hardware processor element 802 to implement the steps, functions or operations as discussed above in connection with the example method 200, 500, 600, or 700. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for managing software application access based on application groupings (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
   receiving, by a processing system of a first user device, a first request from a user of the first user device to unlock access to a first grouping of software applications accessible to the user via a plurality of user devices including the first user device;
   sending, by the processing system, a second request to a remote server to unlock access to the first grouping of software applications on the plurality of user devices; and
   receiving, by the processing system, a first instruction from the remote server in response to the second request, wherein the first instruction causes the first user device to unlock access to the first grouping of software applications based on a determination by the remote server that a usage by the user of software applications in a second grouping of software applications accessible to the user via the plurality of user devices has satisfied a usage goal, wherein the second grouping is distinct from the first grouping, and wherein unlocking the access to the first grouping of software applications unlocks the access to the first grouping of software applications for a limited period of time that is measured cumulatively across the plurality of user devices.

2. The method of claim 1, further comprising, prior to receiving the first request:
   monitoring, by the processing system, a plurality of amounts of time, wherein each individual amount of time of the plurality of amounts of time measures a respective amount of time spent by the user using a different software application of the first grouping of software applications via the first user device;
   sending, by the processing system to the remote server, the plurality of amounts of time, wherein the remote server calculates, based on the plurality of amounts of time, a total amount of time spent by the user using software applications belonging to the first grouping;
   receiving, by the processing system, a second instruction from the remote server in response to the remote server determining, based on the total amount of time and on a threshold amount of time defined in a profile of the user, that a usage limit for the first grouping by the user has been met; and locking, by the processing system in response to the second instruction, the access to the first grouping by the user.

3. The method of claim 2, wherein the total amount of time spent by the user using software applications belonging to the first grouping, the usage goal, and the limited period of time are customizable by an individual who is distinct from the user.

4. The method of claim 1, wherein the usage goal must be satisfied within a fixed window of time in order for the access to the first grouping of software applications to be unlocked.

5. The method of claim 4, wherein the usage goal must be satisfied within a single day.

6. The method of claim 4, wherein the fixed window of time resets each day.

7. The method of claim 1, wherein the responding further comprising:
re-locking, by the processing system subsequent to the limited period of time elapsing, the access to the first grouping of software applications by the user and re-setting the usage goal;
sending, by the processing system subsequent to the re-locking and re-setting, a third request to the remote server to unlock the access to the first grouping of software applications again;
receiving, by the processing system, a second instruction from the remote server in response to the third request, wherein the second instruction causes the processing system to continue locking the access to the first grouping of software applications based on a determination by the remote server that the usage goal for the second grouping of software applications by the user has not been met since the re-setting.

8. The method of claim 7, further comprising:
presenting, by the processing system, a message to the user, wherein the message indicates a required amount of time that the user must spend using software applications belonging to the second grouping in order to unlock the access to the first grouping of software applications again, wherein the required amount of time comprises a difference between an amount of time specified by the usage goal and an amount of time spent by the user using software applications belonging to the first grouping since the re-locking.

9. The method of claim 1, wherein there is no overlap between the software applications belonging to the first grouping and the software applications belonging to the second grouping.

10. The method of claim 1, wherein the first grouping and the second grouping are customizable by an individual who is distinct from the user.

11. The method of claim 2, further comprising:
generating, by the processing system, a report that summarizes time spent by the user using all software applications of the plurality of software applications over a period of one day.

12. The method of claim 2, wherein the user is one of multiple users of the first user device, and the processing system separately monitors, for each user of the multiple users, the time spent using the each software application of the plurality of software applications.

13. The method of claim 2, wherein the profile further defines: the first grouping of software applications, the second grouping of software applications, the usage goal, the plurality of user devices, and a history of requests made by the user for access to the first grouping of software applications.

14. The method of claim 2, wherein the total amount of time must be exceeded within a fixed window of time in order for the access to the first grouping of software applications to be locked.

15. The method of claim 3, where the first instruction causes the first user device to unlock the access to the first grouping without having to contact the individual.

16. A non-transitory computer-readable storage medium storing instructions which, when executed by a processor of a first user device, cause the processor to perform operations, the operations comprising:
receiving a first request from a user of the first user device to unlock access to a first grouping of software applications accessible to the user via a plurality of user devices including the first user device;
a second request to a remote server to unlock access to the first grouping of software applications on the plurality of user devices; and
receiving a first instruction from the remote server in response to the second request, wherein the first instruction causes the first user device to unlock access to the first grouping of software applications based on a determination by the remote server that a usage by the user of software applications in a second grouping of software applications accessible to the user via the plurality of user devices has satisfied a usage goal, wherein the second grouping is distinct from the first grouping, and wherein unlocking the access to the first grouping of software applications unlocks the access to the first grouping of software applications for a limited period of time that is measured cumulatively across the first plurality of user devices.

17. A method, comprising:
receiving, by a processing system including at least one processor, a plurality of periods of time from a plurality of user devices associated with a profile of a user, wherein each period of time of the plurality of periods of time indicates an amount of time spent by the user using one software application of a plurality of software applications on one user device belonging to the plurality of user devices, wherein the plurality of software applications includes software applications belonging to a first grouping of software applications and software applications belonging to a second grouping of software applications, where access by the user to the first grouping of software applications by the plurality of user devices is currently locked;
receiving, by the processing system, a request from a first user device of the plurality of user devices to unlock the access to the first grouping of software applications by the plurality of user devices; and
responding, by the processing system, to the request based on a usage by the user of the software applications belonging to the second grouping of software applications, wherein the second grouping is distinct from the first grouping.

18. The method of claim 17, further comprising, prior to receiving the request:
calculating, by the processing system, a first amount of time spent by the user using the software applications belonging to the first grouping of software applications, wherein the first amount of time comprises a sum of time spent using the software applications belonging to the first grouping of software applications by all user devices in the plurality of user devices within a defined window of time;

determining, by the processing system, that a usage limit for the first grouping of software applications by the user has been met based on the first amount of time at least meeting a first threshold amount of time defined in the profile of the user; and sending, by the processing system in response to the determining, an instruction to the set plurality of user devices to lock the access to the first grouping of software applications by the user.

19. The method of claim 18, wherein the responding comprises:

calculating, by the processing system, a second amount of time spent by the user using software applications belonging to the second grouping, wherein the second amount of time comprises a sum of time spent using the software applications belonging to the second grouping of software applications by all user devices in the plurality of user devices with the defined window of time;

determining, by the processing system, that a usage goal for the second grouping of software applications by the user has been met based on the second amount of time at least meeting a second threshold amount of time defined in the profile of the user; and sending, by the processing system, an instruction to the plurality of user devices to unlock the access to the first grouping of software applications by the user in response to determining that the usage goal has been met.

20. The method of claim 18, wherein the responding comprises:

calculating, by the processing system, a second amount of time spent by the user using software applications belonging to the second grouping, wherein the second amount of time comprises a sum of time spent using the software applications belonging to the second grouping by all user devices in the plurality of user devices with the defined window of time; and determining, by the processing system, that a usage goal for the second grouping by the user has not been met based on the second amount of time failing to at least meet a third amount of time defined in the profile of the user; and sending, by the processing system, an instruction to the plurality of user devices to continue locking the access to the first grouping of software applications by the user in response to determining that the usage goal has not been met.

* * * * *